C. T. SILVER.
AUTOMOBILE BODY AND TOP THEREFOR.
APPLICATION FILED FEB. 28, 1917.
1,387,191.
Patented Aug. 9, 1921.
2 SHEETS—SHEET 1.
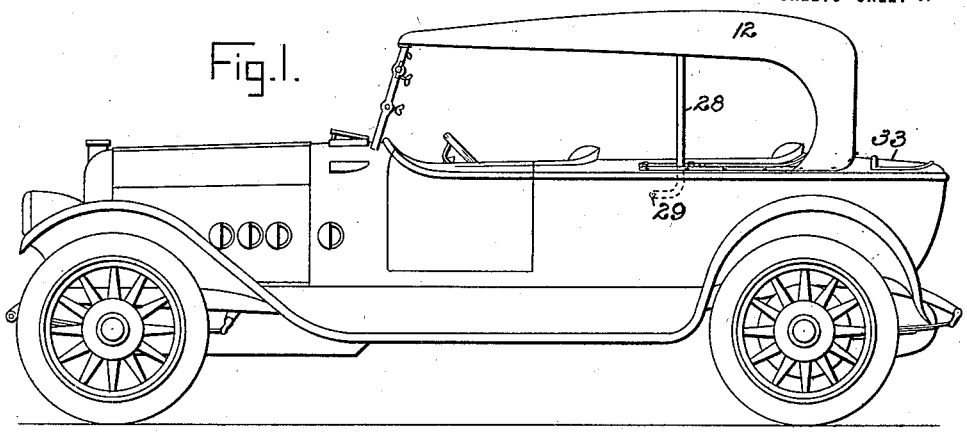
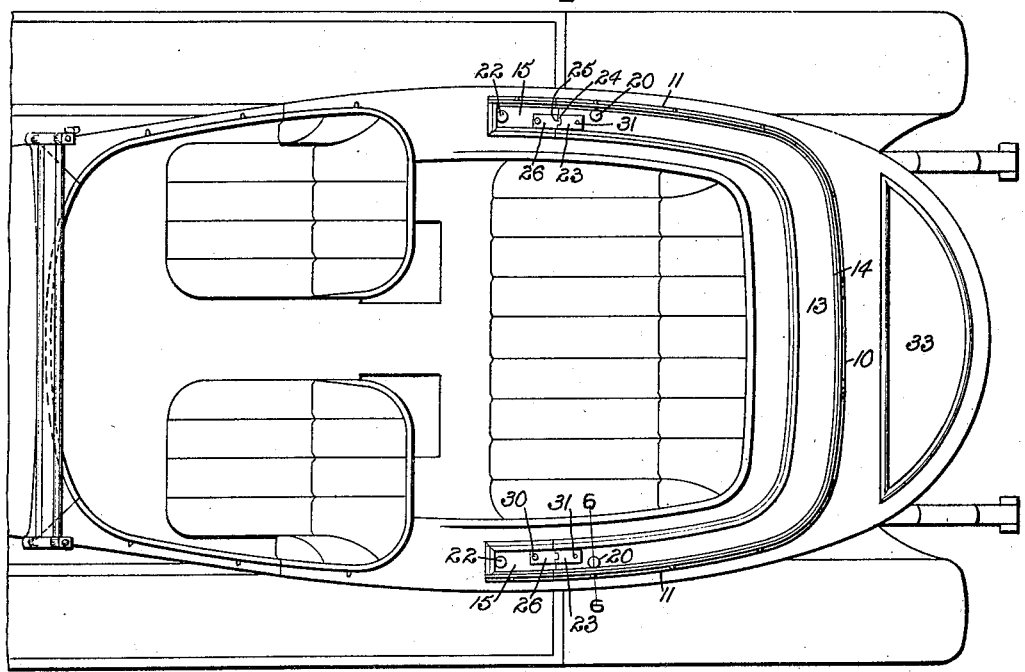
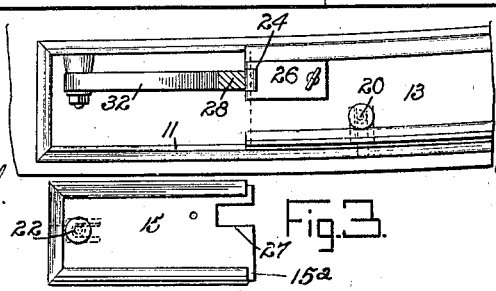
WITNESSES
INVENTOR
Conover T. Silver
BY
ATTORNEYS C. T. SILVER.
AUTOMOBILE BODY AND TOP THEREFOR.
APPLICATION FILED FEB. 28, 1917.
1,387,191.
Patented Aug. 9, 1921.
2 SHEETS—SHEET 2.
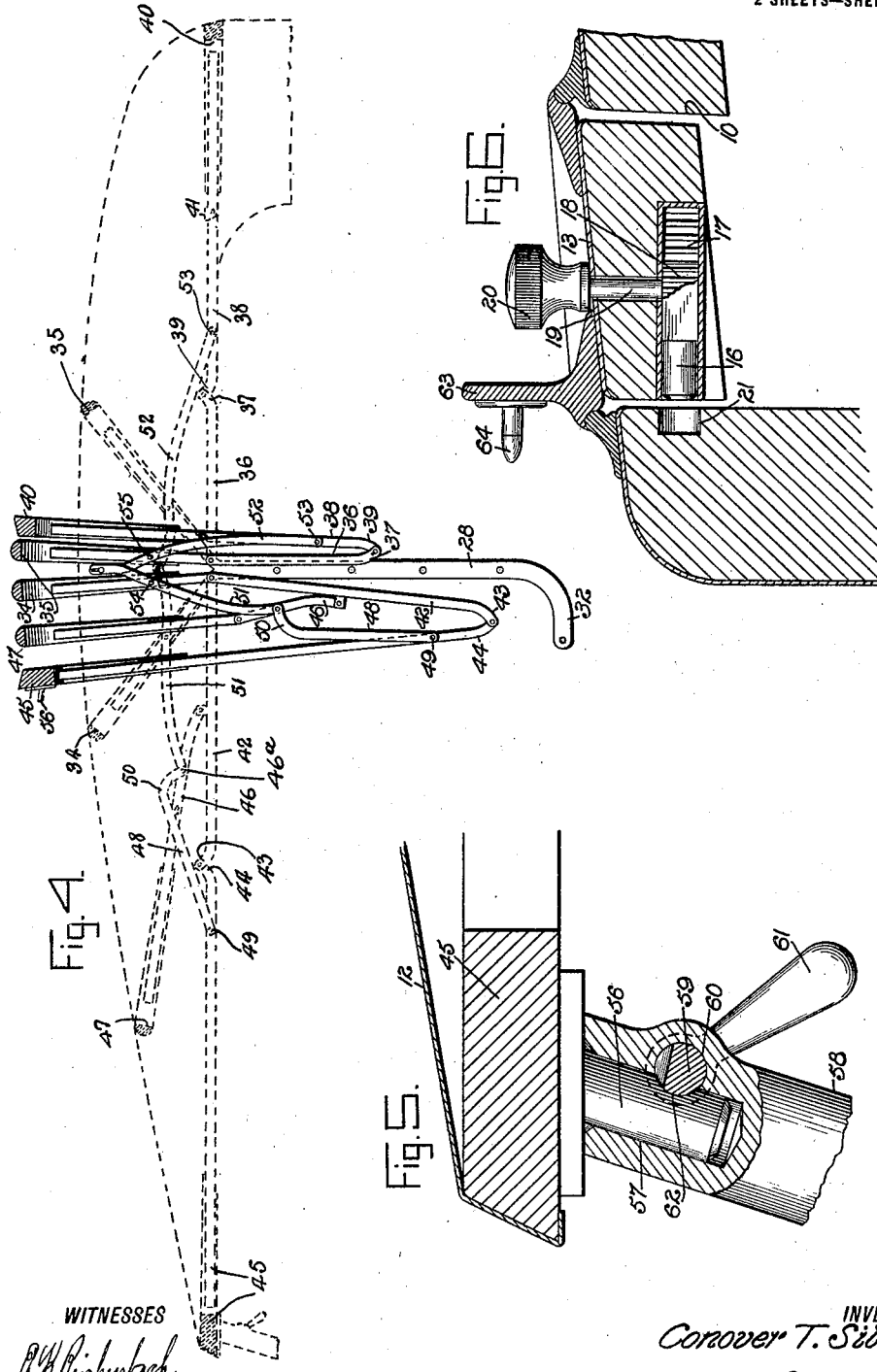

UNITED STATES PATENT OFFICE.

CONOVER T. SILVER, OF NEW YORK, N. Y.

AUTOMOBILE-BODY AND TOP THEREFOR.

1,387,191.   Specification of Letters Patent.   Patented Aug. 9, 1921.

Application filed February 28, 1917. Serial No. 151,447.

*To all whom it may concern:*

Be it known that I, CONOVER T. SILVER, a citizen of the United States, and a resident of the city of New York, borough of Manhattan, county of New York, and State of New York, have invented a new and Improved Automobile-Body and Top Therefor, of which the following is a full, clear, and exact description.

My invention has for its object to provide an automobile body having an opening for receiving the top when it is lowered, means being provided for closing the said opening after the top has been raised or lowered to the desired position.

Another object of the invention is to provide a top which will fold so that it may be moved, with arms pivoted in the opening to permit of the stowing of the top in the opening in the body of the machine.

Still another object of the invention is to provide the body with a tool box in the rear opening in the body.

Additional objects of the invention will appear in the following specification in which the preferred form of the invention is disclosed.

In the drawings similar reference characters denote similar parts in all the views, in which—

Figure 1 is a side elevation showing my automobile body, and top therefor;

Fig. 2 is a plan view of an automobile with the top stowed away;

Fig. 3 is an enlarged fragmentary view in section showing the means for covering the opening at the pivoted arms;

Fig. 4 is a view illustrating the supporting means for the top;

Fig. 5 is an enlarged fragmentary sectional view illustrating the means for securing the top to the wind shield; and Fig. 6 is an enlarged sectional view on the line 6—6 of Fig. 2.

By referring to the drawings, it will be seen that an automobile body is provided with a transverse opening 10 extending through the top of the body, the opening having longitudinally extending portions 11 which are connected with the ends of the transverse portion 10. This opening 10 is provided for receiving the top 12 when it is lowered. Normally the opening 10 with its longitudinally extending portions 11 is covered by a lid 13 which is hinged to the body at its rear edge 14. The lid 13 is only raised when the automobile top 12 is being raised or lowered, for normally the lid 13 covers the opening 10 except the forward ends of the longitudinally extending portions 11 of the said opening, the said forward ends being covered by additional lids 15. The lid 13 is held in closed position by means of bolts 16 one disposed at each side of the body, which are provided with racks 17 with which mesh gears 18 mounted on studs 19 which have operating knobs 20. It will be seen by referring to Fig. 6 of the drawings, that by turning the knobs 20, the bolts 16 may be moved into or out of recesses 21 in the sides of the body. In a similar manner the additional lids 15 are secured in position, the knobs which operate the bolts through the gear and the rack being shown at 22. The forward ends of the lid 13 have plates 23 with recesses 24 in which fit tongues 25 on plates 26, these plates 26 being normally secured to the additional lids 15 and being disposed for closing openings 27 in the said additional lids. The additional lids 15 have rearwardly extending flanges 15ᵃ normally disposed under the forward ends of the lid 13.

When the top 12 is to be raised, the knobs 22 are turned to free the additional lids 15 so that the additional lids may be temporarily removed, after which the knobs 20 are operated to free the bolts 16 from the recesses 21 when the lid 13 is raised. This having been done, the top 12 is raised from within the opening 10, the top being supported and secured in a manner which will shortly be described. This top 12 has supporting arms 28 which are pivoted at 29 at the forward ends of the longitudinally extending portions 11 of the opening 10. The position of the supporting arms 28 is such when the top is raised that the lid 13 may be lowered with the rear edge of the supporting arms 28 disposed in the recesses 24 in the plates 23. The plates 26 are removed from the additional lids 15 by freeing screws 30, after which the additional lids 15 are disposed in position and are secured by turning the knobs 22, the forward portions of the supporting arms 28 being disposed in the recesses 27 in the additional lids 15. The plates 26 are then disposed over the plates 23, and are held in this position by means of the screws 30 which mesh in threaded orifices 31 in the plate 23. The lower ends of the supporting arms 28 are curved at 32 so that when the top 12 is lowered it will be stowed well below the top of the body.

In the rear of the opening 10 the body is provided with a tool box which is closed by a lid 33.

To the supporting arms 28 there are pivoted two bows, a front intermediate bow 34 and a rear intermediate bow 35. There are also pivoted to the supporting arms 28 rearwardly extending arms 36, the rear ends of which are curved upwardly at 37 when the top is raised and in open position. Pivoted to these upwardly curved ends 37 of the rearwardly extending arms 36 there are links 38, the forward ends of these links 38 being curved upwardly at 39, corresponding with the upwardly curved rear ends 37 of the rearwardly extending arms 36. Pivoted to the rear ends of the links 38 there is a rear outrigger bow 40, this bow 40 having its forward ends 41 bent over so that they will rest on the rear ends of the links 38 when the top is in the position indicated by the dotted lines in Fig. 4 of the drawings, the bent over ends 41 of the bow 40 limit the downward movement of the adjacent ends of the bow 40 and the links 38. Pivoted to the supporting arms 28 and extending forwardly therefrom there are arms 42, the forward ends of which are curved upwardly at 43 and to which are pivoted the upwardly curved rearwardly extending ends 44 of a front outrigger bow 45. Pivoted to the forwardly extending arms 42 there are additional arms 46 to which is pivoted an auxiliary bow 47. There are links 48 which are pivoted to the bow 45 and 49, these links 48 having ends 50 which are curved rearwardly and downwardly when the top is in the position shown in the dotted lines in Fig. 4 of the drawings, these ends 50 of the links 48 being pivoted to the arms 46. There are also pivoted to the arms 46 links 51, the said links 51 being pivoted over the supporting arms 28 to links 52, the rear ends of which are pivoted at 53 to the links 38. All the bows 34, 35, 40, 45 and 47 are preferably secured to the top 12. The link is pivoted to the front intermediate bow 34 at 54, and the link 52 is pivoted to the rear intermediate bow 35 at 55.

When the top is raised and in the position shown by the dotted lines in Fig. 4 of the drawings, and the top is to be lowered, the driver of the automobile pulls down on the rearwardly extending arms 36 and the forwardly extending arms 42, which moves the ends of the links 51 and 52 in the direction of the supporting arms 28, which serves to move the bows 34 and 35 together, in as much as the said bows are pivoted to the links 51 and 52. When this has been done, the forward bow 45, which has been freed from the wind shield, is moved upwardly and rearwardly so that the several bows will be disposed relatively to each other in the position shown by the full lines in Fig. 4 of the drawings, when the bows with the top, the arms and the links, may be moved rearwardly into the opening 10 in the body to be stowed out of the way.

It will be seen by referring to Fig. 4 of the drawings that when the top is raised and in normal position, the links 48 will rest against the rear of the bow 45 and the forward end of the arms 42.

As will be seen by referring to Fig. 5 of the drawings, the bow 45 has one or more studs 56 which are disposed in openings 57 in the wind shield 58 for supporting the forward end of the forward bow 45. These studs 56 are held in position in recesses 57 by means of cams 59 which are journaled in bearings 60 in the wind shield, these cams 59 being operated by a rearwardly extending handle 61, and being adapted to be moved into or out of recesses 62 in the studs 56 by a movement of the handle 61.

The lid 13 is provided with a combing 63 having curtain-securing studs 64.

Having thus described my invention, I claim as new and desire to secure by Letters Patent:

1. An automobile body having an opening through its upper surface, a support pivoted in the opening, lids for closing the opening and having adjacent edges with cut-away portions extending through the edges, and means for closing the cut-away portions in the lids when the body of the support is lowered into the opening in the body.

2. An automobile top having two supporting arms, front and rear intermediate bows pivoted to the arms, supporting means carried by the arms and extending beyond the bows in one direction, supporting means carried by the arms and extending beyond the bows in the opposite direction, and links pivoted together and to the said means.

3. An automobile body having an opening through its upper surface extending transversely and longitudinally from the ends of its transverse portion, a support pivoted at its ends in the opening adjacent the ends of the opening, a main lid for closing the transverse portion and parts of the longitudinally extending portions of the opening, and additional lids for closing the remaining parts of the longitudinally extending portions of the opening, the lids having adjacent edges with cut-away portions extending through the edges so that the main lid and the additional lids may be moved to closed positions after the support has been raised.

4. An automobile body having an opening through its upper surface extending transversely and longitudinally from the ends of its transverse portion, a support pivoted at its ends in the opening adjacent the ends of the opening, a main lid for closing the transverse portion and parts of the longitudinally extending portions of the opening, additional lids for closing the remaining parts of the longitudinally extending portions of the opening, the lids having adjacent edges with cut-away portions extending through the edges so that the main lid and the additional lids may be moved to closed positions after the support has been raised, and means for securing the lids in closed position.

5. An automobile body having an opening through its upper surface extending transversely and longitudinally from the ends of its transverse portion, a support pivoted at its ends in the opening adjacent the ends of the opening, a main lid for closing the transverse portion and parts of the longitudinally extending portions of the opening, additional lids for closing the remaining parts of the longitudinally extending portions of the opening, the lids having adjacent edges with cut-away portions extending through the edges so that the main lid and the additional lids may be moved to closed positions after the support has been raised, and means for closing the cut-away portions in the lids when the body of the support is lowered into the opening in the body.

6. An automobile top having two supporting arms, a front intermediate bow pivoted to the arms, a rear intermediate bow pivoted to the arms, supporting means pivoted to the arms and extending beyond the bows in one direction, supporting means pivoted to the arms and extending beyond the bows in the opposite direction, and links pivoted together and to the bows and to the said means.

7. An automobile top having two supporting arms, a front intermediate bow pivoted to the arms, a rear intermediate bow pivoted to the arms, supporting means extending beyond the bows in one direction, supporting means extending beyond the bows in the opposite direction, and links pivoted together, the links being pivoted to the bows and to the said supporting means.

8. An automobile top having two supporting arms, a front intermediate bow pivoted to the arms, a rear intermediate bow pivoted to the arms, supporting means carried by the arms and extending beyond the bows in one direction, links pivoted together over the arms, the links being pivoted to the bows and to the said supporting means, the supporting means at the links being adapted to move downwardly and thereby to move the links to operate the bows.

9. In an automobile a pivoted rear intermediate bow, two rearwardly extending arms pivoted at the first pivot, a rear outrigger bow, pivotal means connecting the last-mentioned bow with the arms, and means connecting the pivotal means with the first bow so that when the second bow at its said means is moved forwardly, the first bow will be moved upwardly.

10. In an automobile top a pivoted rear intermediate bow, two rearwardly extending arms pivoted at the first pivot, a rear out-rigger bow, connecting links articulated to the arms and to the second bow, and additional links connecting the first links with the first bow.

11. An automobile top having an opening extending transversely and longitudinally from its transverse portion, two supporting arms pivoted in the opening, a rear intermediate bow pivoted to the arms, two rearwardly extending arms pivoted to the first arms at the second pivot, a rear out-rigger bow, connecting links articulated to the second arms and to the second bow, and additional links connecting the first links with the first bow.

12. In an automobile top a pivoted front intermediate bow, pivoted forwardly extending arms, a front outrigger bow pivoted to the arms, additional arms pivoted to the first arms, an auxiliary bow pivoted to the additional arms, and links connecting the second bow with the additional arms and the additional arms with the first bow.

13. In an automobile top a pivoted front intermediate bow, pivoted forwardly extending arms, a front outrigger bow pivoted to the arms, additional arms pivoted to the first arms, an auxiliary bow pivoted to the additional arms, links connecting the second bow with the additional arms, and the additional arms with the first bow, and a top secured to the bows.

14. In an automobile top a pivoted front intermediate bow, pivoted forwardly extending arms, a front outrigger bow pivoted to the arms, additional arms pivoted to the first arms, an auxiliary bow pivoted to the additional arms, links curved at one set of ends which are pivoted to the additional arms, the other ends of the links being pivoted to the second bow, and additional links connecting said additional arms with the first bow.

15. In an automobile top, a pivoted front intermediate bow, pivoted forwardly extending arms, a front outrigger bow pivoted to the arms, an auxiliary bow having means pivoted to the arms, links curved at one set of ends which are pivoted to the said means on the third bow, the other ends of the links being pivoted to the second bow, and the links resting on the third bow at its said means, and additional links connecting the said means on the third bow with the first bow.

16. In an automobile top pivoted supporting arms, a front intermediate bow pivoted to the arms, forwardly extending arms pivoted to the first-mentioned arms, a front outrigger bow pivoted to the second-mentioned arms, additional arms pivoted to the second-mentioned arms, an auxiliary bow pivoted to the said additional arms, and links connecting the second bow with the said additional arms and the said additional arms with the first bow.

17. In an automobile top, two arms, two sets of arms pivoted to the first arms, front and rear intermediate bows pivoted to the first arms, a rear outrigger bow, pivotal means connecting the rear outrigger bow with one of the said sets of arms, a front outrigger bow pivoted to the other of said sets of arms, links connected together above the first arms and to the front and rear intermediate bows, the ends of the links being articulated to the said pivotal means, and means connecting the links with the front outrigger bow.

18. In an automobile top, two arms, two sets of arms pivoted to the first arms, front and rear intermediate bows pivoted to the first arms, a rear outrigger bow, pivotal means connecting the rear outrigger bow with one of the said sets of arms, a front outrigger bow pivoted to the other of said sets of arms, links pivoted together above the first arms and to the front and rear intermediate bows, the ends of the links being articulated to said pivotal means, means connecting the links with the front outrigger bow, and an auxiliary bow pivoted to the said other set of arms.

19. In an automobile top, two arms, two sets of arms pivoted to the first arms and with their outer ends bent upwardly, front and rear intermediate bows pivoted to the first arms, a rear outrigger bow, pivotal means connecting the rear outrigger bow with the upwardly bent ends of one set of arms, a front outrigger bow pivoted to the upwardly bent ends of the other of said sets of arms, links pivoted together above the first arms, the links being pivoted to the front and rear intermediate bows, the ends of the links being articulated to said pivotal means, and means connecting the links with the front outrigger bow.

CONOVER T. SILVER.